J. SCHULER.
NUT LOCK.
APPLICATION FILED AUG. 20, 1910.
982,537.
Patented Jan. 24, 1911.
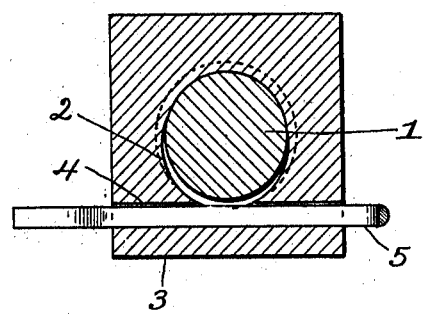
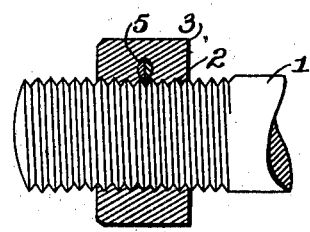
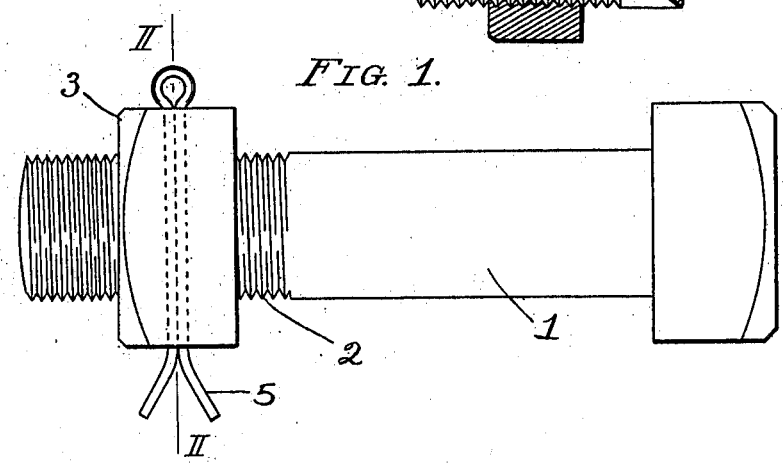
WITNESSES:
INVENTOR,
Joseph Schuler
by H. G. Fischer,
ATTY.

UNITED STATES PATENT OFFICE.

JOSEPH SCHULER, OF KANSAS CITY, MISSOURI, ASSIGNOR OF ONE-FOURTH TO WILLIAM M. FERGUSON AND ONE-FOURTH TO H. O. POLSON, OF KANSAS CITY, MISSOURI.

NUT-LOCK.

982,537.  Specification of Letters Patent.  Patented Jan. 24, 1911.

Application filed August 20, 1910.  Serial No. 578,233.

*To all whom it may concern:*

Be it known that I, JOSEPH SCHULER, a citizen of the United States, residing at Kansas City, in the county of Jackson and State of Missouri, have invented certain new and useful Improvements in Nut-Locks, of which the following is a specification.

My invention relates to nut-locks, and my object is to provide a nut-lock which operates by friction only, which requires no alteration of bolts, and with which the nut always engages the bolt with equal friction, regardless of the nut's position on the bolt. This object is attained by the construction illustrated in the accompanying drawing, in which:—

Figure 1 is a side elevation of a bolt and nut provided with my improved nut-lock; Fig. 2 is a cross section of the same, taken on line II—II of Fig. 1; Fig. 3 is a horizontal sectional view taken at right angles to Fig. 1 and showing the engagement of the split key upon the thread.

1 indicates a bolt, which is cut with the ordinary screw threads 2.

3 indicates a chamfered square nut, having the usual internal threads to engage the bolt. Through the nut, and slightly intersecting the bore of the nut, I drill a small hole 4, adapted to receive a split key or cotter as 5; the spring cotter being preferred. The cotter hole 4 is so positioned that a round cotter as 5, will bear firmly upon the sides or flanks of two adjacent threads of the bolt. A cotter having an angular edge might be employed; the edge of such a cotter could engage to the full depth of the bolt thread.

The nut-lock here shown is applied by simply driving the cotter 5 through the nut and spreading its ends, after having tightened the nut to the desired point. The friction between the cotter and the threads 2 will prevent the nut's becoming loose or turning backward. Should the nut be turned backward with a wrench, the lock would still be operative in holding the nut tightly upon the bolt.

Having described my invention, I claim as new and desire to secure by Letters Patent:

1. A nut-lock consisting of an ordinary nut having a hole therethrough and slightly intersecting the main bore of the nut; and a split key adapted to be inserted in said hole and adapted to frictionally engage the sides of adjacent bolt-threads.

2. A nut-lock consisting of an ordinary nut having a hole therethrough and slightly intersecting the main bore of the nut; and a split key adapted to be inserted in said hole and adapted to take between adjacent threads of the bolt.

In testimony whereof I affix my signature, in the presence of two witnesses.

JOSEPH SCHULER.

Witnesses:
K. M. IMBODEN,
R. E. HAMILTON.